UNITED STATES PATENT OFFICE 2,398,569

AMINOTRIAZINE - FORMALDEHYDE CONDENSATION PRODUCTS AND PROCESS OF MAKING SAME

Gustav Widmer, Basel, Switzerland, assignor, by mesne assignments, to Ciba Products Corporation, Hoboken, N. J., a corporation of New Jersey No Drawing. Application June 25, 1942, Serial No. 448,470. In Switzerland July 29, 1941

6 Claims. (Cl. 260—72)

The subject of the present invention is a process for the manufacture of hardenable reaction products, soluble in organic solvents, of aminotriazine-formaldehyde condensation products and comprises reacting ethers of aminotriazine-formaldehyde condensation products, preferably of melamine-formaldehyde condensation products, with saturated or unsaturated carboxylic acids of the fatty acid series.

It has already been suggested that ethers of the aminotriazine-formaldehyde condensation products should be melted with colophony at temperatures of 180–220° C. Determination of the acid numbers of melts thus obtained has shown, however, that within the limit of error these numbers are unchanged. Therefore, it is obvious that no chemical change has been brought about by this known process.

In contrast to this, it has been found, surprisingly enough, that a reaction actually takes place when ethers of the aminotriazine-formaldehyde condensation products are heated with carboxylic acids of the fatty acid series. The course of this reaction may be ascertained by the lowering of the acid number of the mixture being heated. The quantity of carboxylic acid reacted upon may be determined from the drop in the acid number. As a rule, it is possible to cause from 0.5 mol to over 2 mols of acid to take part in the reaction. The increasing quantity of reaction product may also generally be recognized by the change that takes place in the solubility properties of the mixture.

Parent materials which come into question are those ethers of aminotriazine-formaldehyde condensation products, soluble in organic solvents which are obtained by reaction of the aminotriazine-formaldehyde condensation products or their components in alcoholic medium in presence or absence of acid condensing agents (in this connection, see Patents 2,197,357 and 2,202,200, Example 3). Especial emphasis must here be laid on the alkyl ethers of melamine-methylol compounds, such as the butyl ether, which finds extensive use in the lacquer industry, and the water-soluble methyl ether. On account of their resinous properties they are commonly termed "ether resins." In general it is advisable to make use of the ether resins of the lower alcohols, say from methyl alcohol to amyl alcohol.

As carboxylic acids, all saturated or unsaturated fatty acids come into consideration, preferably, however, the fatty acids of high molecular weight, that is to say those which contain at least 10 carbon atoms, such as stearic, palmitic, oleic, linoleic, and ricinoleic acids, as well as substituted fatty acids, such as naphthenic acids, etc., or polybasic acids, such as succinic acids, sebacic acid and the like. Instead of the free acid, derivatives may be used, if desired, which react in the same manner, for example, the anhydrides, halides, etc.

It is advisable to carry out the reaction in the absence of water, since otherwise mostly previous gelatinization and hardening of the mixture may take place.

It is preferable to carry out the reaction at temperatures between 80–160° C. When acid anhydrides or halides are used, the reaction can take place at lower temperatures, such as at room temperature.

The reaction may be carried out in the presence or absence of organic solvents or diluents, such as butanol, dipentene, benzene. When using acid halides, it is preferable to work in the presence of acid-binding agents, such as caustic alkalis, pyridine, etc.

It is advisable to stop the reaction once the acid number ceases to show appreciable decrease. If the reaction be continued beyond this point, the reaction mixture will finally gelatinize and harden.

According to the nature of the parent materials used, the products of the invention possess very varying physical properties. Oily, highly viscous to tarry and semi-solid to solid products can be obtained.

When using stearic acid or similar acids of high molecular weight, products are obtained which solidify to wax-like bodies, with inclusion of the excess of acid, and which can be used directly as waxes.

The excess acid used can be readily removed by normal methods; in such cases, the products obtained are neutral, or almost neutral, oils, viscous liquids or solids and can be characterized, like fats or oils, by their acid numbers, saponification numbers and ester numbers. Boiling with alcoholic caustic alkali decomposes them in an analogous manner as it does natural fats and oils.

The solubility of the pure products, as mentioned previously, is particularly influenced by the nature and quantity of the organic acids which have taken part in the reaction. Usually, the products obtained are readily soluble in lacquer solvents, such as benzene, toluene, solvent naphtha, turpentine, butyl acetate, butanol, benzine, as well as in linseed oil and many resins; on the other hand, they are insoluble or sparingly soluble in methyl alcohol and less readily soluble in ethyl alcohol.

Furthermore, corresponding with the aminotrianzine-formaldehyde condensation products used as parent materials, the pure products obtained are for the most part readily hardened. By the use of heat and/or accelerators, even by allowing them to stand for an extended period, they can be converted into the insoluble state. Solutions in the lacquer solvents mentioned above are usually more resistant to self-hardening and are therefore suitable for use when applying the new substances in the lacquer industry or for other uses, etc., where the use of solutions is permissible.

By making use of unsaturated acids, for example, the acids of semi-drying or drying oils, products are obtained which possess air-drying properties. The speed of air-drying is greater, for example when linoleic acid is used than in the case of linseed oil itself. The drying properties may be greatly accelerated by the use of the usual dryers, an important point in the lacquer industry.

The color of the new products is very dependent on the degree of purity and the coloring power of the acids, as the aminotriazine components may generally be obtained as very pale to water-clear substances. In accordance with this, the end products usually have a brown or yellow to water-clear color.

Corresponding to the variation in properties determined by the multiplicity of patent materials, the new products can be used for the most varied purposes, such as crude material for burnt-in lacquers or air-drying lacquers, softeners and binding agents, artificial materials, surface active or water-repellent substances, etc.

In the following examples, AN stands for acid number, SN for saponification number and EN for ester number.

*Example 1*

270 parts of a butyl ether resin (obtained from melamine, formaldehyde and butanol according to Example 9 of Patent 2,197,357) in the form of a solution of about 83 per cent strength were first dehydrated completely, the resin being diluted with about 100 parts by volume of butanol, which was then again removed by distillation in vacuo on the oil bath. About 145 parts by volume of distillate were obtained which, in addition to the original butanol, also contained the butanol and water from the parent resin. The internal temperature rose to about 100° C. towards the end of the distillation.

20 parts by volume of butanol and 340 parts of stearic acid were added, and the mixture was melted whilst stirring and heating. The AN of the mixture was 123. The reaction is continued for 2–3 hours under a good vacuum with a rising temperature of 80–130° C., 81 parts by volume of distillate being obtained and the AN dropping to 73. The residue, amounting to about 500 parts, thus contains much stearic acid which has not yet reacted; this is removed to a large degree by repeated washing and stirring with methyl alcohol at about 40° C. After removing the methyl alcohol which remains in the washed residue by distillation, a pale-colored, balsam-like resin is obtained which is readily soluble in the usual lacquer solvents but insoluble in methyl alcohol and water. The product has the following characteristics: AN=8, SN=151, EN=143. It can be used in the artificial resin industry, especially for lacquer purposes. Evaporation of the methyl alcohol extracts yields 150 parts of an almost pure stearic acid, which can be used again.

Very similar products are obtained if, instead of the above butyl ether resin, other alkyl ether resins of melamine are used, for example the methyl ether resin of melamine which is soluble in water and in organic solvents.

Similar products are also obtained if the reaction be carried out in the presence of diluents, such as dipentene, benzene or butyl alcohol; such a procedure can offer advantages during the dehydration of the parent material.

If the reaction be carried out without sufficient dehydration, gelatinization and hardening of the whole mass usually occurs.

*Example 2*

135 parts of a butyl ether resin of melamine (see Example 1) are dehydrated with 50 parts by volume of butanol and are melted with an addition of 170 parts of linoleic acid. The AN drops from 132 to 95, whilst the temperature rises to 140° C. in the course of 1–2 hours. 274 parts of a viscous syrup are obtained which are worked up as described in Example 1 to remove the excess of linoleic acid. 155 parts of an end product are yielded which possesses the following characteristics: AN=10, SN=71, EN=61. The residual linoleic acid, obtained by evaporation of the methyl alcohol, is almost pure and can be used again (131 parts).

The reaction product is a highly viscous, pale-colored oil, readily soluble in lacquer solvents, insoluble in methyl alcohol and in water. Its solutions, upon evaporation, yield a coating which, even without the addition of dryers, dries more rapidly in air than linseed oil. The product can therefore be used for the manufacture of air-drying lacquers, as binding agent for burnt-in lacquers, etc.

Instead of linoleic acid, other acids of semi-drying or drying oils, for example, the acids of poppy oil, cotton oil or wood oil, can be used with similar results.

*Example 3*

107 parts of a melamine-formaldehyde-methyl ether resin (prepared as described in Example 3 of Patent 2,202,200 and freed from mechanically mixed methyl alcohol in vacuo) are mixed with 170 parts of stearic acid and melted to a homogeneous mixture by heating in vacuo. The AN of this mixture is 122. The mixture is then heated for 3–4 hours, the temperature gradually rising from about 100° C. to 135° C. and the AN dropping to about 62. The yield is 239 parts.

In order to prepare the technically pure reaction product, the fat-like, solid mass is dissolved in 120 parts by volume of benzene, repeatedly extracted with 500 parts by volume of methyl alcohol and finally dissolved in benzene to a solution of approximately 70 per cent strength, which contains about 138 parts of the new stearic acid ester.

The product has the following properties: AN=5, SN=105, EN=100.

By evaporation of the methyl alcohol extracts, 103 parts of almost pure stearic acid can be reclaimed.

The butyl ether resin as used as starting material in Examples 1 and 2 may be obtained as follows:

50 parts of hexamethylolmelamine are added to 80 parts by volume of butyl-alcohol and 0.5 part by volume of concentrated hydrochloric acid and the mixture is heated to boiling for ¼ hour. The clear solution thus obtained is concentrated up to a dry content of 83 per cent.

The methyl ether resin as used in Example 3 may be obtained as follows:

50 parts of hexamethylolmelamine are dissolved in 150 parts by volume of methyl-alcohol in the presence of 0.2 part by volume of hydrochloric acid. As soon as solution has occurred, the same is neutralized with caustic soda solution up to the point where phenolphthalein shows a pink color. The solution is then evaporated in vacuo until it is practically free from mechanically admixed methyl-alcohol.

Instead of the above mentioned condensation products of course also other similar condensation products mentioned in U. S. specification 2,197,357 may be used as starting materials.

What I claim is:

1. A process for the manufacture of a hardenable resinous ester, soluble in organic solvents, of an aminotriazine-formaldehyde condensation product, which comprises heating one molecular proportion of an ether of an aminotriazine-formaldehyde condensation product with an esterifying agent consisting of from about 0.5 to about 2 molecular proportions of a fatty acid containing at least ten carbon atoms at a temperature ranging between about 80° C. and 160° C., and terminating the reaction when the acid number ceases to show an appreciable decrease.

2. A process for the manufacture of a hardenable resinous ester, soluble in organic solvents, of a melamine-formaldehyde condensation product, which comprises heating one molecular proportion of an ether of a melamine-formaldehyde condensation product with an esterifying agent consisting of from about 0.5 to about 2 molecular proportions of a fatty acid containing at least ten carbon atoms at a temperature ranging between about 80° C. and 160° C., and terminating the reaction when the acid number ceases to show an appreciable decrease.

3. A hardenable resinous ester, soluble in organic solvents, of an ether of an aminotriazine-formaldehyde condensation product esterified with an esterifying agent consisting of from about 0.5 to about 2 molecular proportions of a fatty acid containing at least ten carbon atoms, per molecular proportion of the ether, the esterification having been terminated as soon as the acid number showed no appreciable decrease.

4. A hardenable resinous ester, soluble in organic solvents, of an ether of a melamine-formaldehyde condensation product esterified with an esterifying agent consisting of from about 0.5 to about 2 molecular proportions of a fatty acid containing at least ten carbon atoms, per molecular proportion of the ether, the esterification having been terminated as soon as the acid number showed no appreciable decrease.

5. A hardenable resinous ester, soluble in organic solvents, of an ether of a melamine-formaldehyde condensation product esterified with an esterifying agent consisting of from about 0.5 to about 2 molecular proportions of stearic acid per molecular proportion of the ether, the esterification having been terminated as soon as the acid number showed no appreciable decrease.

6. A hardenable resinous ester, soluble in organic solvents, of an ether of a melamine-formaldehyde condensation product esterified with an esterifying agent consisting of from about 0.5 to about 2 molecular proportions of linoleic acid per molecular proportion of the ether, the esterification having been terminated as soon as the acid number showed no appreciable decrease.

GUSTAV WIDMER.

---

Certificate of Correction

Patent No. 2,398,569.                                           April 16, 1946.

GUSTAV WIDMER

It is hereby certified that errors appear in the printed specification of the above numbered patent requiring correction as follows: Page 2, first column, lines 1–2, for "aminotrianzine" read *aminotriazine*; and line 29, for "patent" read *parent*; and that the said Letters Patent should be read with these corrections therein that the same may conform to the record of the case in the Patent Office.

Signed and sealed this 4th day of June, A. D. 1946.

[SEAL]

LESLIE FRAZER,
*First Assistant Commissioner of Patents.*

The methyl ether resin as used in Example 3 may be obtained as follows:

50 parts of hexamethylolmelamine are dissolved in 150 parts by volume of methyl-alcohol in the presence of 0.2 part by volume of hydrochloric acid. As soon as solution has occurred, the same is neutralized with caustic soda solution up to the point where phenolphthalein shows a pink color. The solution is then evaporated in vacuo until it is practically free from mechanically admixed methyl-alcohol.

Instead of the above mentioned condensation products of course also other similar condensation products mentioned in U. S. specification 2,197,357 may be used as starting materials.

What I claim is:

1. A process for the manufacture of a hardenable resinous ester, soluble in organic solvents, of an aminotriazine-formaldehyde condensation product, which comprises heating one molecular proportion of an ether of an aminotriazine-formaldehyde condensation product with an esterifying agent consisting of from about 0.5 to about 2 molecular proportions of a fatty acid containing at least ten carbon atoms at a temperature ranging between about 80° C. and 160° C., and terminating the reaction when the acid number ceases to show an appreciable decrease.

2. A process for the manufacture of a hardenable resinous ester, soluble in organic solvents, of a melamine-formaldehyde condensation product, which comprises heating one molecular proportion of an ether of a melamine-formaldehyde condensation product with an esterifying agent consisting of from about 0.5 to about 2 molecular proportions of a fatty acid containing at least ten carbon atoms at a temperature ranging between about 80° C. and 160° C., and terminating the reaction when the acid number ceases to show an appreciable decrease.

3. A hardenable resinous ester, soluble in organic solvents, of an ether of an aminotriazine-formaldehyde condensation product esterified with an esterifying agent consisting of from about 0.5 to about 2 molecular proportions of a fatty acid containing at least ten carbon atoms, per molecular proportion of the ether, the esterification having been terminated as soon as the acid number showed no appreciable decrease.

4. A hardenable resinous ester, soluble in organic solvents, of an ether of a melamine-formaldehyde condensation product esterified with an esterifying agent consisting of from about 0.5 to about 2 molecular proportions of a fatty acid containing at least ten carbon atoms, per molecular proportion of the ether, the esterification having been terminated as soon as the acid number showed no appreciable decrease.

5. A hardenable resinous ester, soluble in organic solvents, of an ether of a melamine-formaldehyde condensation product esterified with an esterifying agent consisting of from about 0.5 to about 2 molecular proportions of stearic acid per molecular proportion of the ether, the esterification having been terminated as soon as the acid number showed no appreciable decrease.

6. A hardenable resinous ester, soluble in organic solvents, of an ether of a melamine-formaldehyde condensation product esterified with an esterifying agent consisting of from about 0.5 to about 2 molecular proportions of linoleic acid per molecular proportion of the ether, the esterification having been terminated as soon as the acid number showed no appreciable decrease.

GUSTAV WIDMER.

---

Certificate of Correction

Patent No. 2,398,569.

GUSTAV WIDMER

April 16, 1946.

It is hereby certified that errors appear in the printed specification of the above numbered patent requiring correction as follows: Page 2, first column, lines 1–2, for "aminotrianzine" read *aminotriazine*; and line 29, for "patent" read *parent*; and that the said Letters Patent should be read with these corrections therein that the same may conform to the record of the case in the Patent Office.

Signed and sealed this 4th day of June, A. D. 1946.

[SEAL]

LESLIE FRAZER,
*First Assistant Commissioner of Patents.*